United States Patent
Armbruster et al.

(10) Patent No.: US 7,149,516 B2
(45) Date of Patent: Dec. 12, 2006

(54) USER CONTROLLED HOME LOCATION REGISTER

(75) Inventors: Peter J. Armbruster, Chandler, AZ (US); Stephen D. Magee, Scottsdale, AZ (US); Bradley R. Schaefer, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 741 days.

(21) Appl. No.: 09/997,513

(22) Filed: Nov. 29, 2001

(65) Prior Publication Data
US 2003/0100302 A1    May 29, 2003

(51) Int. Cl.
*H04Q 7/20* (2006.01)
(52) U.S. Cl. .................. 455/433; 455/414.1; 455/418; 455/419; 455/432.1; 455/435.1; 707/10
(58) Field of Classification Search ............. 455/414.1, 455/418, 419, 432.1, 432.3, 433, 435.1; 370/310.2, 370/328, 331; 707/10, 102, 104.1
See application file for complete search history.

(56) References Cited

U.S. PATENT DOCUMENTS

| | | | |
|---|---|---|---|
| 5,564,068 A * | 10/1996 | Nguyen | 455/433 |
| 5,758,355 A * | 5/1998 | Buchanan | 707/201 |
| 5,802,468 A * | 9/1998 | Gallant et al. | 455/422.1 |
| 5,881,235 A * | 3/1999 | Mills | 709/221 |
| 6,058,301 A * | 5/2000 | Daniels | 455/411 |
| 6,081,731 A * | 6/2000 | Boltz et al. | 455/565 |
| 6,108,540 A * | 8/2000 | Sonti et al. | 455/433 |
| 6,182,087 B1 * | 1/2001 | Lim | 707/204 |
| 6,269,244 B1 * | 7/2001 | Alperovich et al. | 455/433 |
| 6,296,191 B1 * | 10/2001 | Hamann et al. | 235/492 |
| 6,453,162 B1 * | 9/2002 | Gentry | 455/433 |
| 6,591,105 B1 * | 7/2003 | Hussain et al. | 455/444 |
| 6,603,969 B1 * | 8/2003 | Vuoristo et al. | 455/433 |
| 6,671,523 B1 * | 12/2003 | Niepel et al. | 455/558 |
| 6,681,232 B1 * | 1/2004 | Sistanizadeh et al. | 707/104.1 |
| 6,745,029 B1 * | 6/2004 | Lahtinen et al. | 455/432.1 |

* cited by examiner

*Primary Examiner*—Steve M. D'Agosta
(74) *Attorney, Agent, or Firm*—Frank J. Bogacz; Kevin D. Wills

(57) ABSTRACT

A personal home location register (HLR) (10 –20) is modifiable directly by a user. The personal HLR then communicates with a telecommunications service provider (30) to directly affect changes in the personal HLR. The network HLR (70) of the telecommunications service provider simply points to the personal HLR of the user.

3 Claims, 1 Drawing Sheet

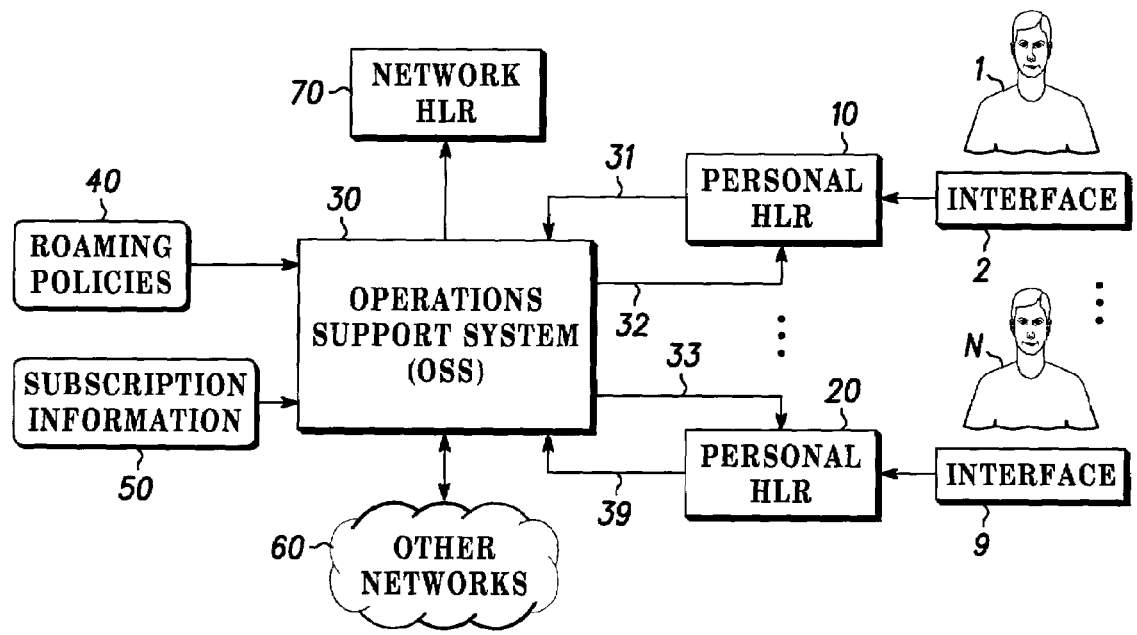

USER CONTROLLED HOME LOCATION REGISTER

BACKGROUND OF THE INVENTION

The present invention pertains to communication system subscriber services and more particularly to maintenance and storage of subscriber (user) service profiles.

In existing cellular communications systems, user service profiles and subscription restriction agreements are currently stored in a centralized home location register (HLR). The HLR is typically a large database which is owned and configured by the network operator, the local telephone company. User service profiles include the kinds of services to which a user subscribes, for example, call waiting, call forwarding and three-way calling, etc. Subscription restriction agreements include those which govern functions such as roaming with a cellular phone. All such user information is commonly stored in a HLR which is maintained and configured by a telephone company.

Changes to the user's service profile are administered by the telephone company which provides the operation support system (OSS). Typically the HLR is a single function within each Public Land Mobile Network (PLMN). In order to affect changes the user must submit a service change request for either roaming services or basic subscription services or both. The restriction agreements governing roaming functions and others may be distributed among other HLRs in other Public Land Mobile Networks (PLMN) based on the service level agreement between the various telephone operations companies. The service level agreements allow each telephone operating company to generate revenue based on subscribers from foreign PLMNs who roam into their particular PLMN. Changes to restriction agreement must be administered by an operator of the OSS.

As a result, any changes to a subscriber's HLR entry is difficult to change. It may require operator interface to affect the change. Several HLRs may have to be contacted to retrieve and/or modify appropriate service level agreement information. Furthermore, it may take substantial time to update the database of the particular HLR which is associated with the operation support system.

Therefore, it would be advantageous to provide the user or subscriber who desires to modify his restrictive agreements or service profiles or to initiate new services the capability to do so without complex interaction with the telephone company and affect such changes rapidly.

BRIEF DESCRIPTION OF THE DRAWING

The single sheet of drawings included herewith is a block diagram of a user interaction with a distributed home location register arrangement in accordance with the present invention.

DESCRIPTION OF THE PREFERRED EMBODIMENT

The single drawing sheet depicts a block diagram of a distributed or personal home location register arrangement. Instead of a common home location register (HLR) located in the telephone network system, each subscriber (user) 1 through N would have his or her own personal HLR 10–20. Personal HLRs 10–20 may include a home computer or other intelligent computing device connected to the internet. Each subscriber 1–N maintains his or her personal HLR via interface 2–9. For example, subscriber 1 will input through interface 2 the new features or changed service level agreements which he wishes to have into his personal HLR 10.

Personal HLR 10 then communicates with the operations support system (OSS) 30 of a telecommunication(s) service provider (telephone company) and transmits the feature or roaming changes required via link 31. Link 31 may be an internet link, wireless link or wire line interface. OSS 30 will then request roaming policies 40 or subscription information regarding feature changes 50. OSS 30 will perform the appropriate interfacing for billing associated with each of the feature changes and pass the provisioning information to personal HLR 10 via link 32. Link 32 may also be an internet link, wireless link or wire line interface. In addition, OSS 30 also changes the network HLR 70 for subscriber 1 such that the network HLR points to the personal HLR 10 for subscriber 1. As a result, when requests for features are made of the network HLR, the network HLR 70 will point to the personal HLR 10 which will contain the appropriate modified up-to-the-minute subscription and roaming information for subscriber 1.

OSS 30 may also receive service level agreement information from other PLMNs 60. Similarly, subscriber N will input changes through interface 9 to his personal HLR 20, for example, personal HLR 20 then passes on the changes to OSS 30 via link 33. Similarly, link 39 maybe an internet link, wireless link or wire line interface. OSS 30 then obtains current roaming policies 40 and subscription information 50 concerning whether the subscriber N has call waiting, call forwarding or other telephonic features. OSS 30 then transmits the authorized changes via link 33 to personal HLR 20. In addition, OSS 30 set the network HLR 70 for subscriber N to point to personal HLR 20.

In an alternate embodiment, some measure or possibly all the service content, provisioning information and roaming information may be stored on the personal HLR. New services can be downloaded from a source as the internet of the telephone system to the home computer by the subscriber without the need to configure the network to support these services. For example, a subscriber may wish to download a new service to their home computer that is not offered by the telephone company. The mobile subscriber could then execute the service from their mobile handset with their home computer acting as an external feature server to the network. Additionally, these subscriber specific services could be supported by an external feature server, with personal HLR containing a pointer to this external feature server.

As can be seen from the above explanation, this arrangement eliminates the need for the subscriber to request all changes through the telephone company's operator. This arrangement also allows subscription restrictions to be determined on a per feature basis. For example, a subscriber may wish to enable nationwide roaming prior to a business trip. The subscriber could modify the restriction in his personal HLR without operator intervention.

In another embodiment, this arrangement allocates the personal HLR to the feature service provider. In this instantiation of the invention, the feature's specific provisioning information typically stored in the HLR is now distributed to the HLR function associated with the feature service provider. Consequently, the network service provider HLR merely points to the feature service provider's HLR. Some or possibly all service content, provisioning information and roaming information which is required to operate this particular feature is stored on the feature service provider's HLR. The feature service provider may provision an act of a new service without the need to configure the network to support these services. As an example of roaming restrictions, a subscriber can now modify the restrictions on a per feature basis without impacting the network's HLR.

The distribution of the HLR function as described above provides the capability for a subscriber to directly modify restrictions, service profiles and agreements, and invoke new services without the intervention of an operator of the telephone company.

This invention can be added into existing networks through the use of network HLR 70. Since network HLR 70 routes all requests for a subscriber to their personal HLR (10–20), requests from foreign networks that have not implemented personal HLRs can be accommodated. Also, a PLMN can deploy both personal HLRs for some subscribers and network HLRs which use the traditional subscription management method for other subscribers, allowing for an orderly migration plan. This is termed a mixed mode deployment method.

This invention also supports new service models for network operators. For instance, the mixed mode deployment method provides the opportunity for a multi-tiered service model where subscribers who pay a higher rate are allowed greater service flexibility through the use of the Personal HLR while other subscribers who pay a lower rate use the traditional method (the network HLR). Another instance is a push-based service where the subscriber pays a fee to have services pushed to the Personal HLR. For example, there could be an entertainment service which pushes different media services (music, articles, video clips) to the subscriber daily.

Although the preferred embodiment of the invention has been illustrated, and that form described in detail, it will be readily apparent to those skilled in the art that various modifications may be made therein without departing from the spirit of the present invention or from the scope of the appended claims.

What is claimed is:

1. A distributed home location register (HLR) comprising:
    a personal home location register (HLR) located in a processor of a user, but not located with a telecommunication services provider;
    an interface to the personal home location register for a user to select services;
    a link to an operations support system of the telecommunication services provider for obtaining services;
    a network home location register (HLR) coupled to the operations support system of the telecommunications service provider
    a plurality of users, each user of the plurality of users having an individual HLR within the network HLR indicating said services which are available to each user, wherein the individual HLR for a particular user includes a pointer to the personal HLR.

2. An arrangement for distributing a home location register (HLR) from a telecommunications service provider, said arrangement comprising:
    processor means including the home location register, said processor means operating independent of the telecommunication service provider and located with a particular subscriber, and said processor means coupled to said telecommunications service provider for communication; and
    database means for storing subscriber information for a plurality of subscribers, said database means coupled to said telecommunication service provider, said telecommunication service provider operating in response to a request from said processor means to obtain said subscriber information for said Particular subscriber, wherein said database means includes a database for storing roaming information, and wherein said particular subscriber inputs change to the HLR to modify the roaming information within the distributed HLR.

3. An arrangement for a distributed home location register (HLR) comprising:
    a personal home location register (HLR) located within a processor means of a particular user; and
    a telecommunications service provider including a network home location register (HLR), said telecommunications service provider coupled to said processor means, said network HLR pointing to said personal HLR, wherein the telecommunications service provider includes a traditional network HLR for other users wherein the particular user is charged a first rate for the personal HLR, and wherein the other users are charged a second rate for the traditional network HLR.

* * * * *